United States Patent [19]

Gravel

[11] Patent Number: 5,333,637
[45] Date of Patent: Aug. 2, 1994

[54] PNEUMATIC INSTRUMENT PARTICLE TRAP

[75] Inventor: James L. Gravel, Prior Lake, Minn.

[73] Assignee: Rosemount Inc., Eden Prairie, Minn.

[21] Appl. No.: 76,820

[22] Filed: Jun. 11, 1993

[51] Int. Cl.⁵ .......................... G05D 16/00
[52] U.S. Cl. .......................... 137/83; 137/544; 95/268; 73/706
[58] Field of Search ............ 137/82, 544, 549, 83; 95/267, 268; 96/197, 198; 73/706

[56] References Cited

U.S. PATENT DOCUMENTS

| | | | |
|---|---|---|---|
| 2,867,219 | 1/1959 | Hug | 131/10 |
| 2,954,779 | 10/1960 | Lebert | 131/187 |
| 2,954,783 | 10/1960 | Lebert | 131/187 |
| 3,269,394 | 8/1966 | Curtis, Jr. | 131/210 |
| 3,313,308 | 4/1967 | Grasso | 131/187 |
| 3,351,072 | 11/1967 | Baum et al. | 131/266 |
| 3,433,231 | 3/1969 | Siragusa | 131/10.5 |
| 3,490,465 | 1/1970 | Kalbfeld | 131/187 |
| 3,557,800 | 1/1971 | Virgili | 131/261 |
| 3,601,133 | 8/1971 | Van Eck et al. | 131/261 B |
| 3,692,037 | 9/1972 | Pinkstaff | 137/83 |
| 3,777,765 | 12/1973 | Yoshinaga | 131/261 B |
| 3,957,465 | 5/1976 | Pircon | 95/267 |
| 4,131,130 | 12/1978 | Ruby | 137/82 X |
| 4,186,909 | 2/1980 | Patel | 137/544 X |
| 4,481,967 | 11/1984 | Frick | 137/85 |
| 4,534,376 | 8/1985 | Brown | 137/83 |
| 4,577,652 | 3/1986 | Blatner | 137/82 |
| 4,638,830 | 1/1987 | Brown et al. | 137/83 |
| 4,653,523 | 3/1987 | Brown | 137/85 |
| 4,715,397 | 12/1987 | Stearns | 137/82 |
| 4,764,186 | 8/1988 | Langer | 95/268 |
| 4,900,514 | 2/1990 | Fuller | 422/84 |
| 5,144,842 | 9/1992 | Pelkey et al. | 73/706 |

FOREIGN PATENT DOCUMENTS

1365712  11/1964  France .

OTHER PUBLICATIONS

Selected pages from a manual entitled "Product Manual for the Model 3311", bearing a date of Sep., 1991.
Eight (8) color photographs showing views of parts of a Model 3311 Current-to-Pressure Transducer. The parts are believed to be substantially the same as parts offered for sale by Rosemount Inc. prior to one year before the filing date of the present patent application, except that potions of some of the parts have been cut away to reveal details such as the placement of passageways. Connecting screws, and a gasket made to fit between the two main halves of the metal housing, are not shown in the photographs.

Primary Examiner—Martin P. Schwadron
Assistant Examiner—Kevin L. Lee
Attorney, Agent, or Firm—Westman, Champlin & Kelly

[57] ABSTRACT

A transducer which provides a regulated pneumatic output as a function of an electric control input includes a housing, a gas regulator, and a particle trap. The housing has a passage therein, the passage including an inlet for receiving a pressurized gas supply and an outlet. The particle trap is disposed in the passage and includes a trap plate and a trap nozzle which directs gas against the trap plate so as to remove undesired entrained particles from the gas before it reaches the gas regulator.

15 Claims, 5 Drawing Sheets

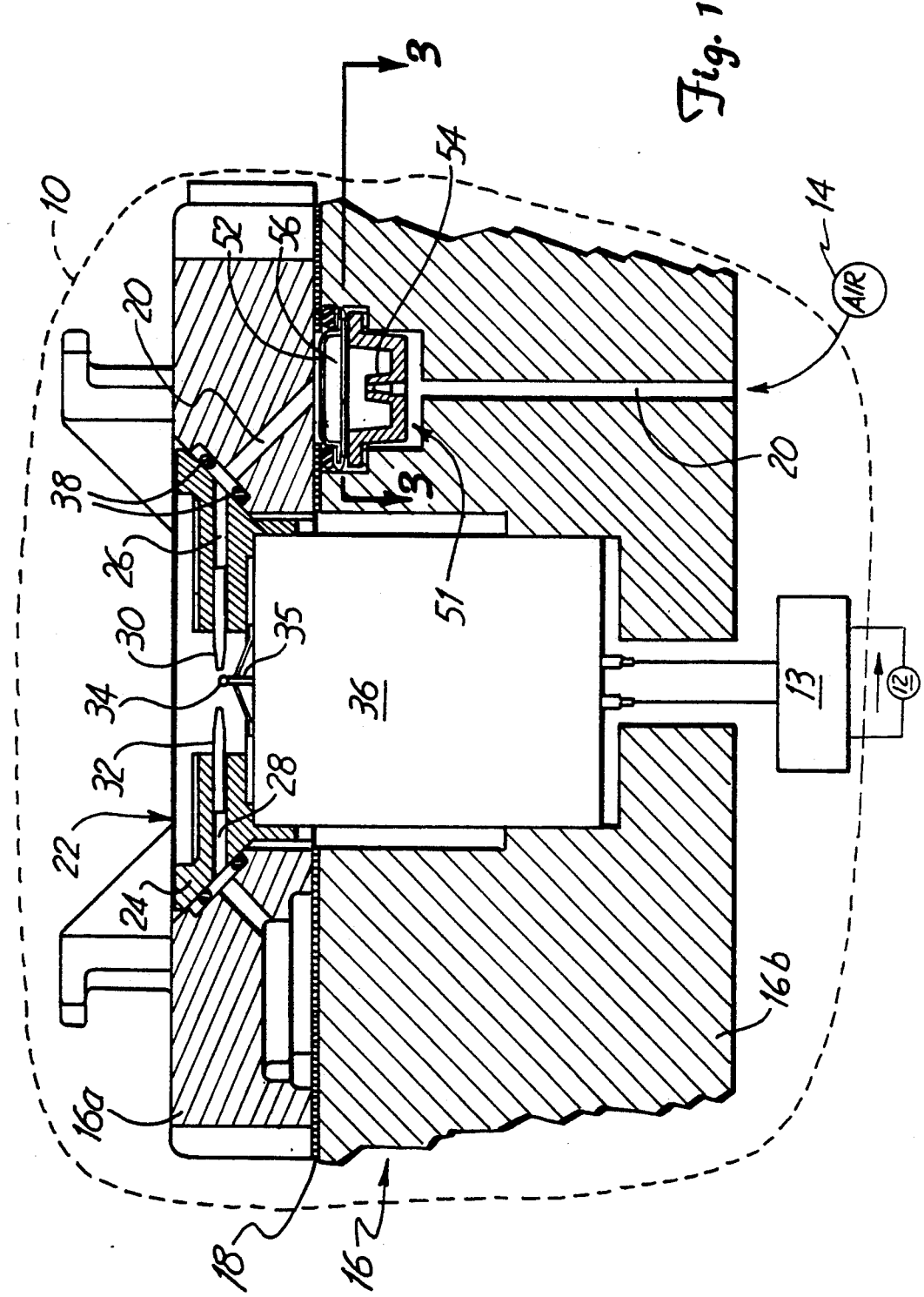

PNEUMATIC INSTRUMENT PARTICLE TRAP

BACKGROUND OF THE INVENTION

The present invention relates to pneumatic instruments which receive a pressurized gas supply input and an electric control input to provide a regulated pneumatic output as a function of the electric control input. Such instruments are herein referred to as I/P transducers, because the electric control input is ordinarily an electric current "I" and the output is ordinarily a pneumatic pressure "P". In particular, the invention relates to particle trapping devices for I/P transducers.

The user of an I/P transducer provides the pneumatic gas supply input to the unit, which gas supply often includes particles entrained therein. Present I/P transducers employ filters of various types to remove such particles from the pneumatic line before they can distort the transducer output or otherwise damage the unit. Particles can distort the I/P transducer output by abrading precision components or by plugging small orifices of the I/P transducer. Filters used to remove such particles include wire mesh screens and combination filter-regulator devices, the latter of which are often attached directly to the input port of the I/P transducer housing. Such filters do an effective job of removing most of the harmful particles, thereby improving reliability of the I/P transducer.

However, in some installations the user's pneumatic air supply includes particles which stick to and accumulate on sensitive parts of the I/P transducer, and which the prior art filters do not effectively filter out. These particles are herein referred to as "sticky" particles. They are believed to comprise a combination of oil droplets, rust, and water vapor.

BRIEF SUMMARY OF THE INVENTION

In the present invention, an I/P transducer includes a housing having a passage with an inlet for receiving at least a portion of the pressurized gas supply, a gas regulator which includes a regulator nozzle receiving gas from an outlet of the passage and a displaceable deflector responsive to the electric control input and cooperating with the regulator nozzle to regulate the pneumatic output of the transducer, and a particle trap disposed in the passage and including a trap plate and a trap nozzle, the trap nozzle directing gas against the trap plate. The trap nozzle is sized to separate undesired entrained particles from the gas by depositing them on the trap plate such that a reduced number of such particles reach the gas regulator. In one aspect of the invention, the trap nozzle has an outlet with a cross-sectional area 1 to 2 times a cross-sectional area of the regulator nozzle outlet. In a preferred embodiment the trap nozzle outlet area is 1.4 to 1.7 times the regulator nozzle outlet area to maintain a relatively low pressure drop across the trap nozzle outlet while substantially replicating entrained particle ejection speeds at the regulator nozzle. In another aspect of the invention the passage includes a first bore and a second bore wider than the first bore, and the housing includes a shoulder between the first and second bores. In this aspect of the invention the trap nozzle is at least partially disposed in the first bore, and the trap plate presses toward the shoulder. In still another aspect of the invention a trap nozzle array replaces the trap nozzle.

BRIEF DESCRIPTION OF THE DRAWINGS

FIG. 1 is a sectional view of part of an I/P transducer in accordance with the present invention, with some elements shown in block form;

In the figures, components which perform the same or similar functions bear the same reference numeral.

DETAILED DESCRIPTION OF THE PREFERRED EMBODIMENTS

Figure 1A:
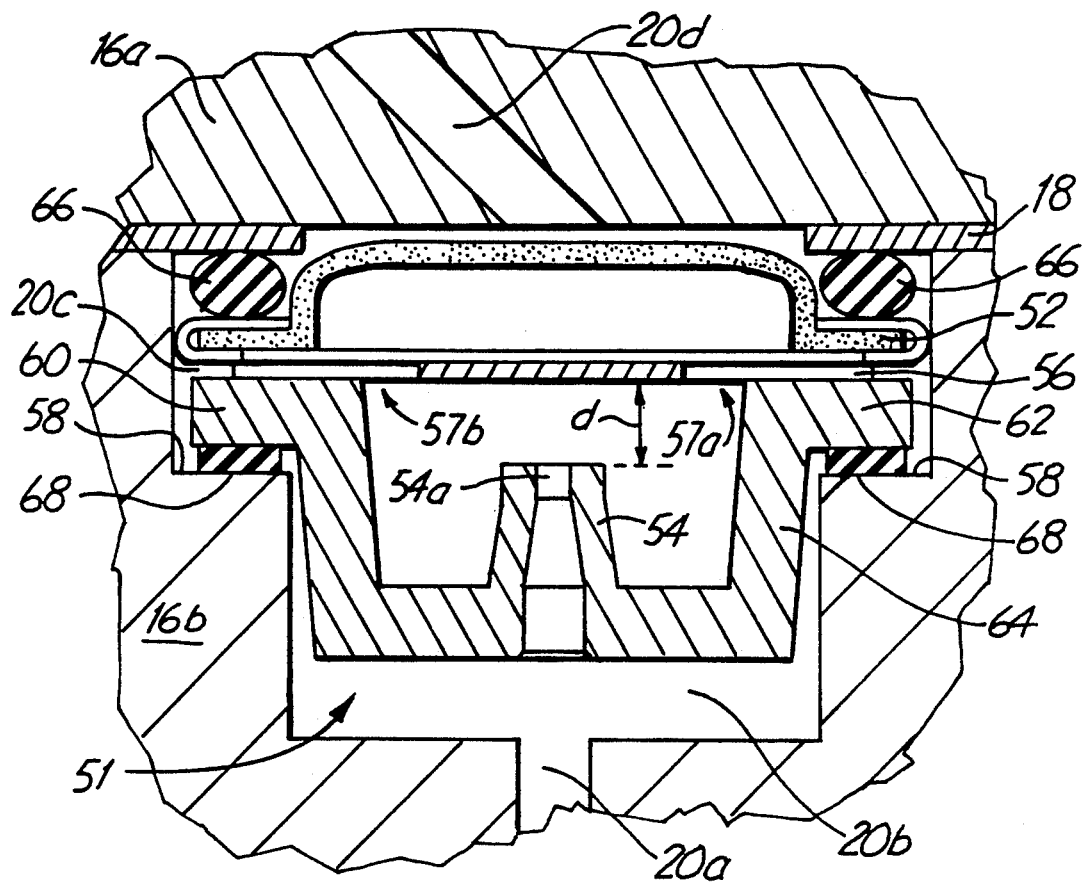
FIGS. 1A and 1B are enlarged views of portions of FIG. 1.
Figure 1B:
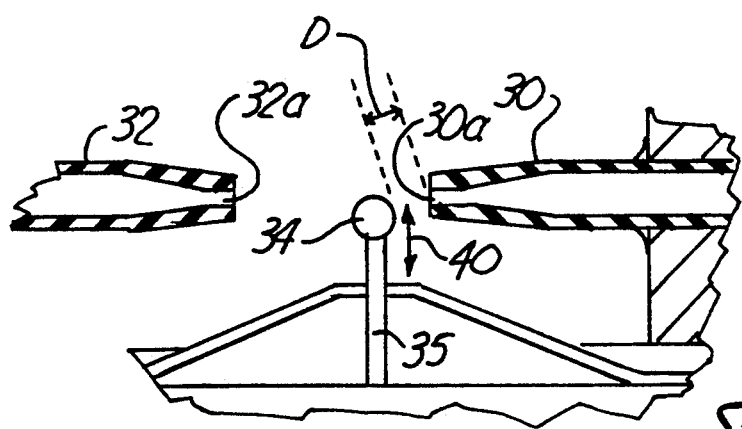
Figure 2:
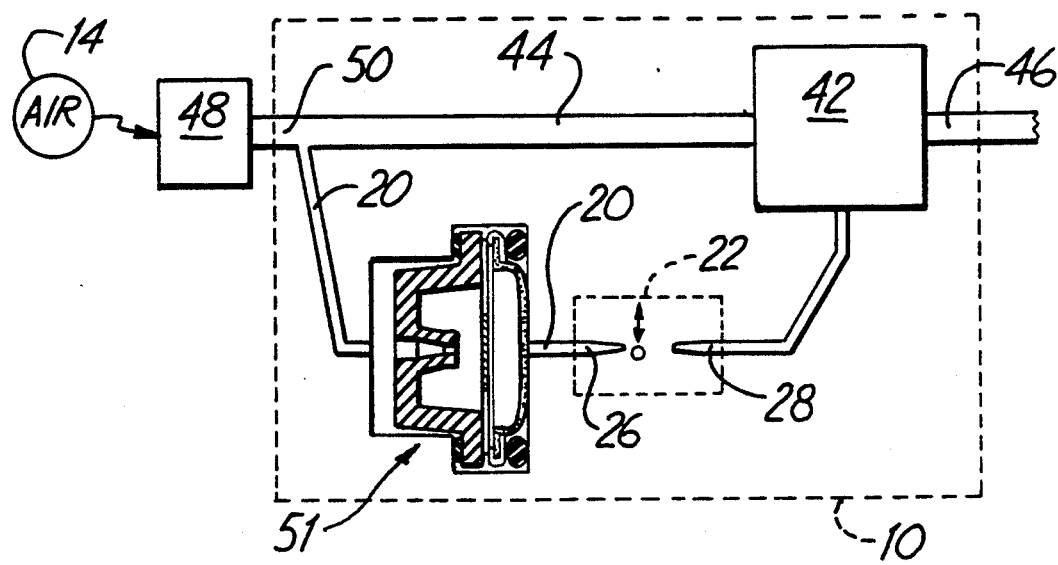
FIG. 2 is a block diagrammatic view, in partial cross-section, of an I/P transducer in accordance with the invention.

Turning now to FIGS. 1 and 2, I/P transducer 10 accepts at least a portion of pressurized gas supply 14 and a control signal from electric current source 12, and provides a pneumatic output at 46 with a pressure that varies as a function of the control signal. Pressurized gas supply 14 typically comprises air pressurized to about 20 psi ($\sim 1.4 \times 10^5$ N/m$^2$) above a local atmospheric pressure, in which case pneumatic output at 46 can vary from about 3 psi ($\sim 2.1 \times 10^4$ N/m$^2$) to about 15 psi ($\sim 1.0 \times 10^5$ N/m$^2$) above local atmospheric pressure. Electric current source 12 couples to a circuit 13 of transducer 10 and can supply a current variable from 4 to 20 milliamperes (mA), at least a portion of which powers transducer 10, the magnitude of the current providing the control signal to transducer 10. Alternately, source 12 can provide a digital control signal to transducer 10.

Transducer 10 includes housing 16 which comprises housing portions 16$a$, 16$b$ held together by screws (not shown) and separated by a gasket 18. Housing 16 includes a passage 20 therethrough, through which at least a portion of gas supplied by pressurized gas supply 14 flows.

Gas regulator module 22, which includes a head 24 with bores 26, 28 therethrough, opposed nozzles 30 and 32, a displaceable deflector 34, and an actuator 36, mates with housing 16 and is held thereto by screws (not shown). An o-ring 38 reduces leaks at a junction of passage 20 and bore 26. Nozzle 30 receives gas from passage 20 via bore 26 and directs it toward opposed nozzle 32. Deflector 34, disposed proximate an outlet 30$a$ of nozzle 30 (see FIG. 1B), moves parallel to double arrow 40 to change an amount of gas flow diverted away from nozzle 32, thereby to regulate a pneumatic pressure in bore 28. As shown in FIG. 2, bore 28 in turn communicates with pneumatic booster amplifier 42 as does passage 44, carrying pressurized gas supply 14 directly to booster amplifier 42. As is known in the art, pneumatic pressure in bore 28 controls the amount of gas from gas supply 14 which passes through booster amplifier 42, thereby controlling the pneumatic pressure in output passage 46.

The construction and operation of the gas regulator mechanism involving moveable deflector 34 and nozzles 30, 32 are described in detail in U.S. Pat. No. 4,534,376, which is incorporated by reference. In particular, deflector 34 preferably comprises a length of wire held perpendicular to both double arrow 40 and the axis of nozzle 30, via post 35. An embodiment of pneumatic booster amplifier 42 useable with the invention is described in U.S. Pat. No. 4,653,523, also herein incorporated by reference.

Unwanted particles entrained in the flowing gas can impair operation of transducer 10 by abrading precision components such as inner walls of nozzle 30, front and upper surfaces of deflector 34, or leading portions of nozzle 32, and by plugging up small orifices such as nozzle outlet 30a or nozzle inlet 32a. It is known to use a combination air filter-regulator device 48 at input port 50 of transducer 10 to remove at least a portion of such unwanted entrained particles from pressurized gas supply 14. It is also known to use a screen or mesh-type filter 52 within passage 20 upstream of nozzle 30 to remove still more particles from gas flowing in passage 20. Filter 52 can comprise a dual screen assembly having one layer of 200 mesh screen (Tyler Standard screen scale) and one layer of 50 mesh screen bound together by an annular clip ring. Particles not removed by filters 48 or 52 for the most part merely strike deflector 34 or leading portions of nozzle 32 and are then swept away by the gas flow.

However, filters such as 48 and 52 have been found to be inadequate to remove sticky particles. Such sticky particles are believed to comprise oil droplets, rust debris, or moisture, or a combination of these components. Oil droplets and rust can originate from compressors used to pressurize gas supply 14. Some users deliberately inject oil droplets into supply 14 so that such oil droplets can collect on and lubricate other devices such as valves connected to supply 14. Sticky particles are problematic to transducer 10 because, rather than merely striking deflector 34 and being swept away, they stick to and collect on deflector 34. Pneumatic output pressure at 46 is very sensitive to the position of deflector 34 relative to nozzle outlet 30a. Buildup of sticky particles on deflector 34 in effect changes the shape and position of deflector 34, resulting in an unwanted shift in pneumatic output pressure for a given applied electric control input. Also, buildup of sticky particles on receiving nozzle 32 can reduce the size of nozzle inlet 32a, resulting in a further shift in pneumatic output pressure.

Constriction at nozzle outlet 30a causes a relative acceleration of the gas flow at that point, so that nozzle 30 ejects particles, including sticky particles, at relatively high speed toward deflector 34 and nozzle 32. It is believed that the particles referred to as "sticky" actually have a distribution of adhesive properties, so that at a given impact speed some sticky particles will adhere to the target while others will bounce off like ordinary "nonsticky" particles. At faster speeds a greater percentage of the sticky particles will adhere to the target.

To reduce the number of sticky particles adhering to and building up on precision components, transducer 10 includes a particle trap 51 for sticky particles. Particle trap 51 includes a nozzle 54 and a plate 56 disposed in passage 20 upstream of nozzle 30, nozzle 54 directing gas flow against plate 56. Nozzle 54 has a nozzle outlet 54a, seen in FIG. 1A, which is sized such that a speed of entrained particles at nozzle outlet 54a approximates a speed of entrained particles at nozzle outlet 30a. In this way, a sticky particle which would adhere to deflector 34 given its impact speed will instead adhere to plate 56. Plate 56 therefore acts as a collector for such particles. On the other hand, a different sticky particle which would not adhere to deflector 34 given its impact speed will also tend not to adhere to plate 56 but instead be carried along with the gas flow. In embodiments where particle trap 51 is disposed in passage 20 as shown in FIGS. 1 and 2 such that substantially all the gas passed by nozzle 54 is also passed by nozzle 30, the area fo nozzle outlet 54a (measured in a plane perpendicular to the axis of nozzle 54) substantially equals the area of nozzle outlet 30a in order to achieve substantially equal particle speeds. By substantially replicating, at nozzle 54, gas flow conditions at nozzle 30, only particles which would adhere to defector 34 are collected at plate 56. This is advantageous because particle buildup on plate 52 is kept low while still removing the most troublesome sticky particles from the gas flow upstream of nozzle 30.

In embodiments where the particle trap is disposed in passage 44 between input port 50 and the entrance to passage 20, nozzle outlet 54a is, again, sized such that a speed of entrained particles at nozzle outlet 54a approximates a speed of entrained particles at nozzle outlet 30a. However, it is advantageous to place the particle trap in passage 20 rather than upstream in passage 44 proximate input port 50, to ensure that gas which does not pass nozzle 30 or deflector 34 also does not pass through the particle trap. This keeps particle buildup on plate 52 of the particle trap low. Sticky particles carried through passage 44 directly to pneumatic booster amplifier 42 have not been observed to appreciably degrade performance of transducer 10.

Preferably, each nozzle 30 and 54 has radial symmetry about a nozzle axis. In order to provide a wide range of output pneumatic pressure it is desirable to keep the pressure drop across passage 20 low. To maintain a low pressure drop across nozzle outlet 54a relative to the pressure drop across outlet 30a, while still achieving approximately equal particle speeds as discussed above, the area of nozzle outlet 54a is preferably from about 1 to 2 times the area of nozzle outlet 30a. Within this range a narrower range of 1.4 to 1.7 is preferred. A prototype in which nozzle outlet 30a had a diameter of 0.016±0.001 inches (~0.41±0.03 millimeters) and nozzle outlet 54a had a diameter of 0.020±0.001 inches (~0.51±0.03 mm) operated satisfactorily. In that case the area ratio was $(0.020/0.016)^2$, or about 1.56.

Referring to FIG. 1A, passage 20 comprises bores 20a, 20b, 20c, 20d in the vicinity of particle trap 51. In a preferred embodiment, bores 20a and 20d each have a diameter of ~0.062 inches (~1.6 mm), and bores 20b and 20c have diameters of ~0.312 inches (~7.92 mm) and ~0.445 inches (~11.3 mm), respectively. Housing portion 16b has a shoulder 58 between bores 20b and 20c. Insert 60 includes a flange 62, a sleeve 64, and nozzle 54. Housing portion 16a removeably mates with housing portion 16b. When housing portions 16a and 16b are separated, then gasket 18, o-ring 66, wire screen 52, plate 56, insert 60, and gasket 68 can be removed and cleaned or replaced. When mated, housing portion 16a presses against flange 62 through gasket 18, o-ring 66, wire screen 52, and plate 56, forcing flange 62 toward shoulder 58.

Sleeve 64 extends downward from flange 62 to meet the base of nozzle 54, which nozzle extends back upward toward flange 62. The tip of nozzle 54, surrounding nozzle outlet 54a, is recessed from the top of flange 62 by a distance "d". Where plate 56 is flat (as shown in the figures) this distance d corresponds to a "nozzle/-plate gap" between nozzle outlet 54a and the impingement surface of plate 56, on which sticky particles collect. preferably, to collect substantially only those particles which would stick to deflector 34, the nozzle/plate gap is similar to a "nozzle/deflector gap", which corresponds to a minimum distance "D" between deflector 34 and nozzle outlet 30a over the range of travel of deflector 34. The nozzle/plate gap and the nozzle/deflector gap are best characterized not in absolute units such as millimeters, but in dimensionless multiples of the diameter (or equivalent transverse dimension in the case of a noncircular nozzle outlet) of the nozzle outlet, i.e., the diameter of nozzle outlet 54a and the diameter of nozzle outlet 30a, respectively. In the aforementioned prototype, which performed satisfactorily, the nozzle/plate gap was ~2.5 (d was approximately 2.5 times the diameter of nozzle outlet 54a) while the nozzle/deflector gap was ~1 (D was approximately equal to the diameter of nozzle outlet 30a). Preferably, the nozzle/plate gap has a value between ~1/5 and ~5 times the nozzle/deflector gap.

Figure 3:
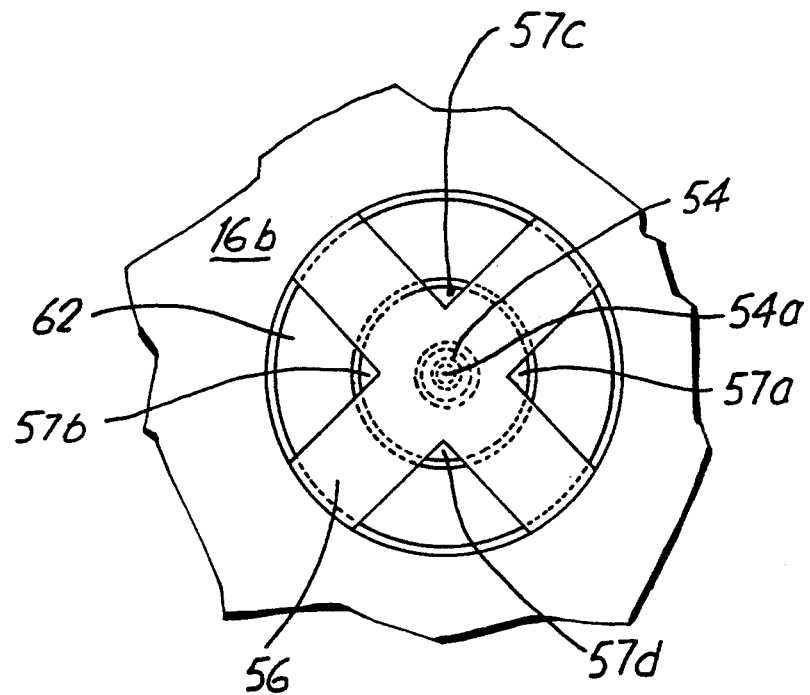
FIG. 3 is an enlarged view along line 3—3 of FIG. 1.

Referring now to both FIGS. 1A and 3, nozzle 54 directs gas flow against plate 56, and plate 56 is shaped to define openings 57a, 57b, 57c, 57d bounded by edges of plate 56 and an inner edge of flange 62. To maintain a low pressure drop across particle trap 51 the combined area of openings 57a-57d is no less than 10 times the area of nozzle outlet 54a. But to adequately intercept a sufficient fraction of unwanted sticky particles such combined area is no greater than about 16% of the area of the gas-carrying passage immediately upstream of such openings 57a-57d, which in this case is the circular area bounded by the inner edge of flange 62.

Figure 4:
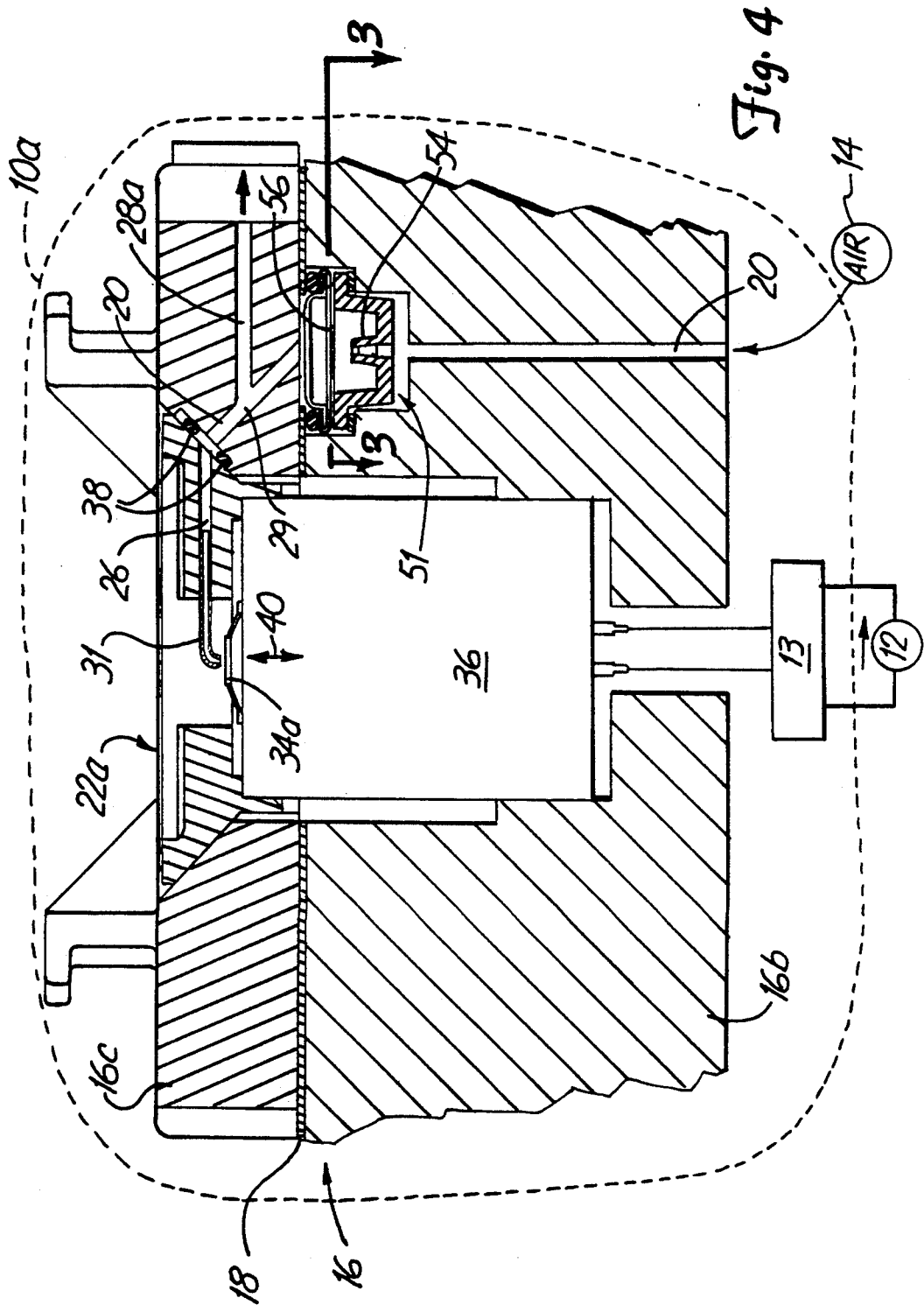
FIG. 4 shows an embodiment of the invention similar to FIG. 1 but utilizing a flapper plate.

In FIG. 4 another embodiment of the invention is shown. I/P transducer 10a is similar to I/P transducer 10 except that in the gas regulator the more conventional flapper plate technique is substituted for the opposed nozzle configuration. Modified upper housing portion 16c replaces housing portion 16a, and gas regulator module 22a replaces gas regulator module 22. Actuator 36 of gas regulator 22a moves a flapper plate deflector 34a along double arrow 40 in response to the control signal received from source 12. As flapper plate deflector 34a moves closer to the outlet of nozzle 31, backpressure increases in bore 26, in bore 28a, and in the portion of passage 20 connecting them. As flapper plate deflector 34a recedes from the outlet of nozzle 31, backpressure in passage 28a decreases. Bore 28a communicates with pneumatic booster amplifier 42 to control the pneumatic output at 46 in similar fashion to bore 28, as seen in FIG. 2. Bore 28a connects to passage 20 at junction point 29. Conventional flapper plate I/P transducers require a flow restrictor, upstream of the bore 28a which directly communicates with the pneumatic booster amplifier 42, in order to partially isolate the high pressure air supply 14 from the bore 28a to permit variable gas pressure in bore 28a. In transducer 10a, nozzle 54 advantageously functions both as the particle-trap nozzle which directs gas against plate 56, and as the required flow restrictor. In this embodiment the outlet of nozzle 54 is sized chiefly to provide the necessary flow restriction, and the area of the nozzle 54 outlet need not have any particular relationship to the area of the nozzle 31 outlet. However, while satisfying this condition, it is preferable to size the nozzle 54 outlet as close as possible to the nozzle 31 outlet for the reasons discussed previously.

Many modifications can be made to the embodiment shown in FIG. 4 within the scope of the invention. Straight nozzle 30 can replace bent nozzle 31, flapper plate deflector 34a can be positioned on its end parallel to double arrow 40, and actuator 36 can operate to deflect the flapper plate deflector substantially horizontally as viewed from FIG. 4. Transducer 10a can include a separate flow restrictor in passage 20, and particle trap 51 can be positioned upstream or downstream of the separate flow restrictor.

Figure 5:
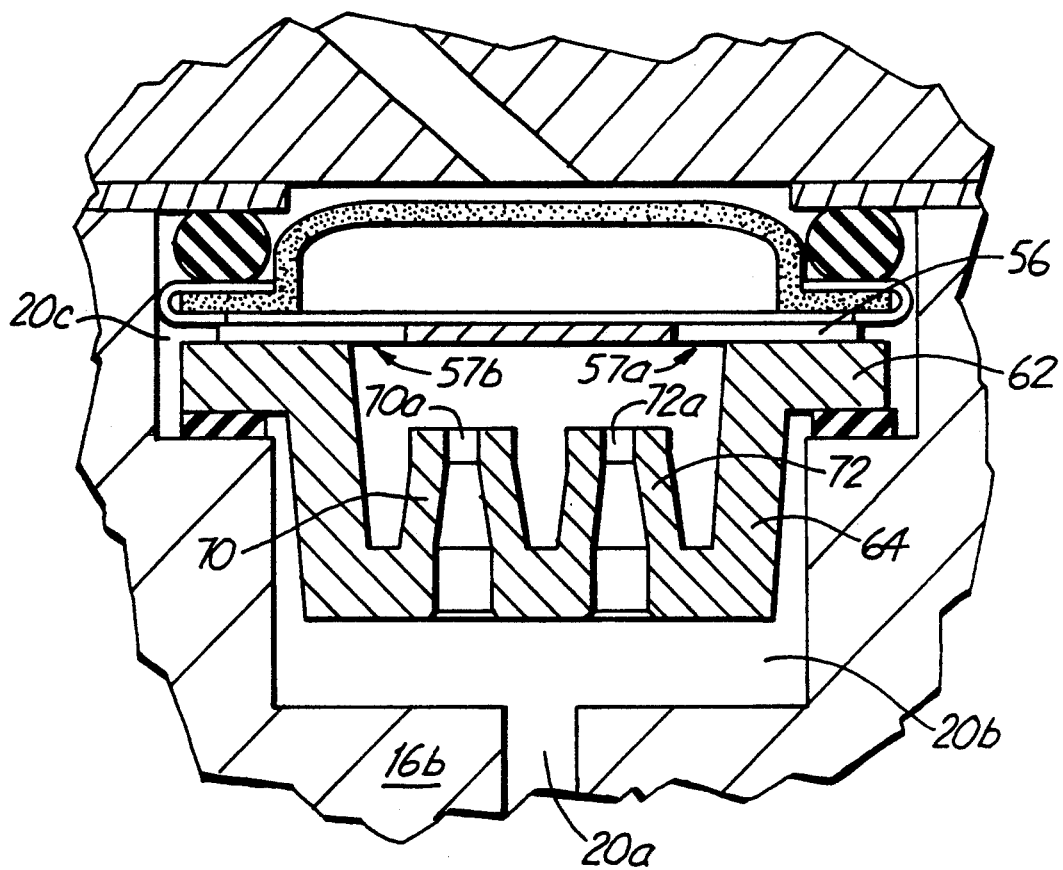
FIG. 5 corresponds to FIG. 1A but shows an alternate embodiment of the invention.

FIG. 5 shows a view similar to FIG. 1A but of an alternate embodiment of the particle trap, wherein nozzle 54 is replaced by a plurality of nozzles 70, 72 having nozzle outlets 70a, 72a, respectively. In replacing nozzle 54 with nozzles 70, 72, nozzle outlets 70a, 72a are preferably sized such that their combined area equals the area of outlet 54a. Relationships referred to earlier involving the size of outlet 54a also apply to the nozzle array of FIG. 5, but wherein the combined nozzle area is substituted for the outlet 54a area. The particle trap of FIG. 5 can be used in both the I/P transducer 10 and the I/P transducer 10a.

Materials useable with the invention are: 30% glass-filled nylon for insert 60; any 300 series stainless steel for plate 56; tungsten-carbide steel for deflector 34; any 300 series stainless steel for nozzles 30, 32; and any 300-series stainless steel for deflector 34a.

Although the present invention has been described with reference to preferred embodiments, workers skilled in the art will recognize that changes can be made in form and detail without departing from the spirit and scope of the invention. For example, bores, passages, and nozzle orifices can have a cross-sectional shape other than circular. The collecting plate of the particle trap need not be flat. The gas regulator can be integral to the housing rather than contained in a removeable module. Voltage rather than current can be used for electric control and power. The electric control input can be derived from an optical control signal.

What is claimed is:

1. A transducer which receives a pressurized gas supply and an electric control input to provide a regulated pneumatic output as a function of the electric control input, comprising:

a housing having a passage therein, the passage including an inlet for receiving at least a portion of the pressurized gas supply and an outlet;

a gas regulator including a regulator nozzle receiving gas from the outlet and a displaceable deflector responsive to the electric control input and cooperating with the regulator nozzle to provide the regulated pneumatic output; and a particle trap disposed in the passage and including a trap plate and a trap nozzle, the trap nozzle directing gas against the trap plate.

2. The transducer of claim 1, wherein the trap nozzle is sized to separate undesired entrained particles from the gas by depositing them on the trap plate such that a reduced number of such particles reach the gas regulator.

3. The transducer of claim 1, wherein the regulator nozzle has an outlet with a first cross-sectional area and the trap nozzle has an outlet with a second cross-sectional area, the second area being 1 to 2 times the first area.

4. The transducer of claim 3, wherein the second area is 1.4 to 1.7 times the first area.

5. The transducer of claim 1,
    wherein the particle trap includes an insert disposed in the passage and including the trap nozzle;

wherein the passage includes a first bore and a second bore wider than the first bore;

wherein the housing includes a shoulder between the first and second bore; and wherein the trap nozzle is at least partially disposed in the first bore, and the trap plate presses toward the shoulder.

6. The transducer of claim 5, wherein the trap plate is removeable from the housing.

7. The transducer of claim 5, wherein the trap plate is substantially flat.

8. The transducer of claim 5, wherein the trap plate has a shape generally of a "X".

9. The transducer of claim 5, wherein the insert further includes:

a flange which presses toward the shoulder; and a sleeve connecting the flange to the trap nozzle.

10. The transducer of claim 1, the particle trap further including:

a trap nozzle array including the trap nozzle and having a plurality of trap nozzle outlets;

wherein the plurality of trap nozzle outlets have a combined first area and the regulator nozzle has an outlet with a second area, the combined first area being 1 to 2 times the second area.

11. The transducer of claim 10, wherein the combined first area is 1.4 to 1.7 times the second area.

12. The transducer of claim 1, wherein the housing has a second passage connected to the first-named passage at a junction, the pneumatic output being controlled by a gas pressure in the second passage;

wherein the displaceable deflector cooperates with the regulator nozzle to vary a gas pressure in the second passage, thereby to vary the pneumatic output of the transducer; and wherein the junction is disposed between the trap nozzle and the regulator nozzle, the trap nozzle being sized to function as a flow restrictor.

13. An I/P transducer for providing a regulated pressure output in response to an electrical input signal, comprising:

a housing having a passage;

inlet means coupled to the passage for receiving pressurized gas from a pressurized gas source and conducting the pressurized gas to the passage;

outlet means coupled to the passage for expelling the pressurized gas;

gas regulator means, coupled to the outlet means, for receiving the electrical input signal and selectively altering flow of the pressurized gas as a function of the electrical input signal to provide the regulated pressure output;

a particle trap plate disposed in the passage and partially blocking the passage; and a particle trap nozzle disposed in the passage upstream from the particle trap plate, the particle trap nozzle directing pressurized gas toward the particle trap plate;

whereby sticky particles carried in the pressurized gas are ejected from the particle trap nozzle toward the particle trap plate and adhere to the particle trap plate, and the pressurized gas flows past the particle trap plate.

14. A transducer which receives a pressurized gas supply and an electric control input to provide a regulated pneumatic output as a function of the electric control input, comprising:

a housing having a passage therein, the passage including an inlet for receiving at least a portion of the pressurized gas supply and an outlet;

a gas regulator including a regulator nozzle receiving gas from the outlet and a displaceable deflector responsive to the electric control input and cooperating with the regular nozzle to provide the regulated pneumatic output;

a trap surface; and a trap nozzle located in the passage and directing gas against the trap surface.

15. The transducer of claim 14, wherein the trap nozzle is positioned relative to the trap surface and sized to separate undesired entrain particles from the gas by depositing them on the trap surface such that a reduced number of such particles reaches the gas regulator.

* * * * *

UNITED STATES PATENT AND TRADEMARK OFFICE
CERTIFICATE OF CORRECTION

PATENT NO. : 5,333,637
DATED : August 2, 1994
INVENTOR(S) : James L. Gravel

It is certified that error appears in the above-indentified patent and that said Letters Patent is hereby corrected as shown below:

Title page:
Under [56] OTHER PUBLICATIONS, line 8, change "potions" to --portions--;

Col. 4, line 5, please delete "fo" and insert --of-- at the end of the line.

Col. 5, line 1, please change "preferably" to --Preferably--;

Col. 7, line 25, insert a space between "1" and "to"; and

Col. 8, line 33, please change "regular" to --regulator--.

Signed and Sealed this

Twenty-eighth Day of November 1995

Attest:

BRUCE LEHMAN

Attesting Officer

Commissioner of Patents and Trademarks